United States Patent [19]

Keiser, Jr.

[11] 4,014,093
[45] Mar. 29, 1977

[54] HEDGE SHEARS
[76] Inventor: David H. Keiser, Jr., 53 Park Road, Wyomissing Hills, Pa. 19610
[22] Filed: Nov. 20, 1975
[21] Appl. No.: 633,703
[52] U.S. Cl. ............................................. 30/248
[51] Int. Cl.² ................................... A01G 3/04
[58] Field of Search ............ 30/266, 267, 248, 268, 30/257

[56] References Cited
UNITED STATES PATENTS

| | | | |
|---|---|---|---|
| 2,661,534 | 12/1953 | Keiser | 30/248 |
| 3,834,022 | 9/1974 | Students | 30/267 X |

Primary Examiner—Al Lawrence Smith
Assistant Examiner—J. C. Peters
Attorney, Agent, or Firm—William J. Ruano

[57] ABSTRACT

Improvements in hedge shears which eliminates the need for springs and in which one blade assembly is formed of two parts, both pivotally rotatable on a post rigidly connected to the other blade. The two parts are interconnected loosely by an offset portion of the driving element which applies driving force to a pin integral with the driven element to effect a moment of force for laterally tilting the associated blade throughout the cutting stroke.

1 Claim, 5 Drawing Figures

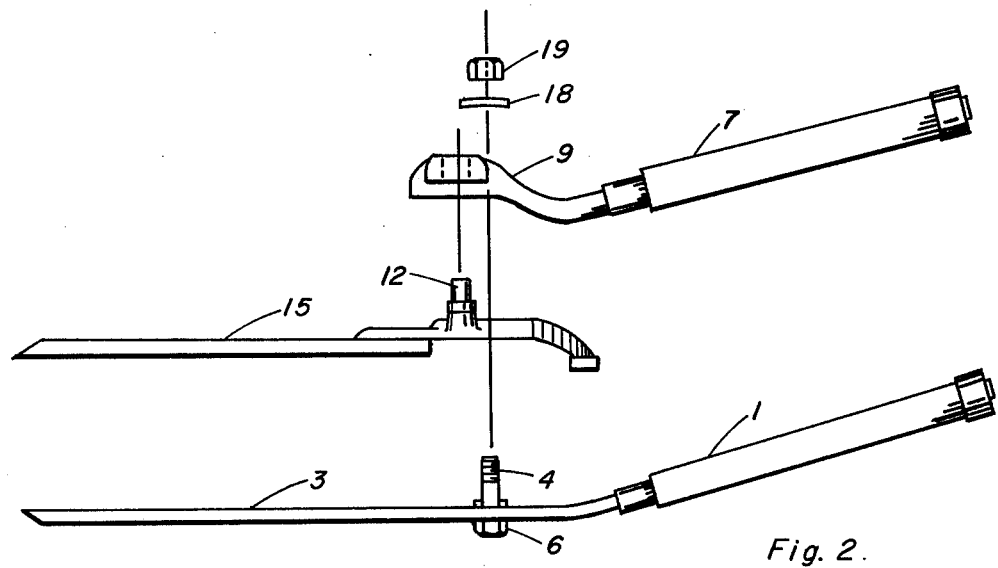
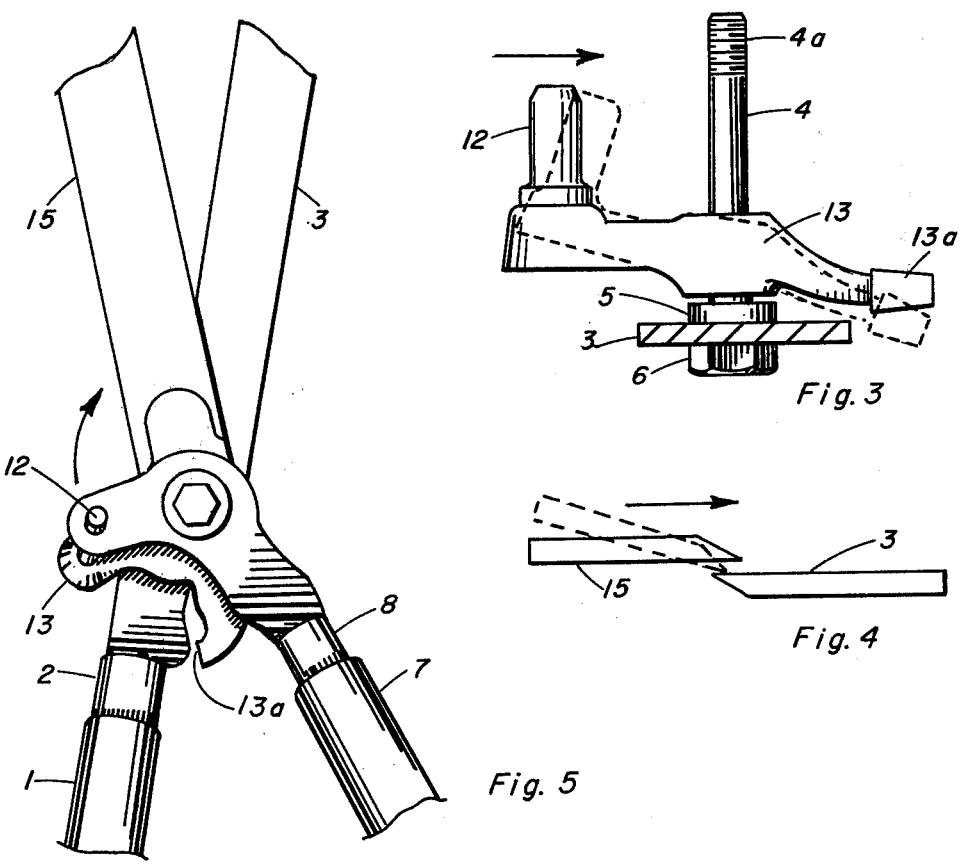

HEDGE SHEARS

This invention relates to improvements in hedge shears and constitutes an improvement over the hedge shears covered by my prior U.S. Pat. Nos. 3,470,613 and 3,566,467.

A disadvantage of prior hedge shears, of the type for canting or tilting a pivotally movable blade laterally of the longitudinal direction of the blade, is that springs were required in the canting assembly which gave rise to problems, such as variation of compressive strength of such springs over a period of time and the need for adjusting the compression from time to time as well as the introduction of looseness in the cutting action which interferes with such action when very heavy grass clumps or twigs are cut.

An object of the present invention is to provide a novel and highly improved hedge shears which is devoid of the abovementioned disadvantages of my prior shears and those of the prior art.

A more specific object of my invention is to provide hedge shears with a novel drive arrangement devoid of helical springs for the canting action of one of the blades, laterally of its longitudinal direction, so as to give a more positive canting and cutting and which is not affected by variations in compressive action of such springs, consequently which requires practically no adjustment throughout its life.

Another object is to provide grass shears having a higher degree of applied force and higher efficiency as well as a considerably greater ease in cutting action, thus avoiding fatigue of the user.

Other objects and advantages will become more apparent from a study of the following description, taken with the accompanying drawings wherein:

FIG. 2 is a side view of the shears shown in FIG. 1;

FIG. 3 is a side view of the driven element pivotally mounted on the post with parts shown dotted to illustrate the lateral canting thereof;

FIG. 4 is a cross-sectional view of the blades wherein the dotted outline illustrates the canting movement of one of the blades; and, FIG. 5 is a top, fragmentary view showing a complete assembly of the hedge shears.

Figure 1:
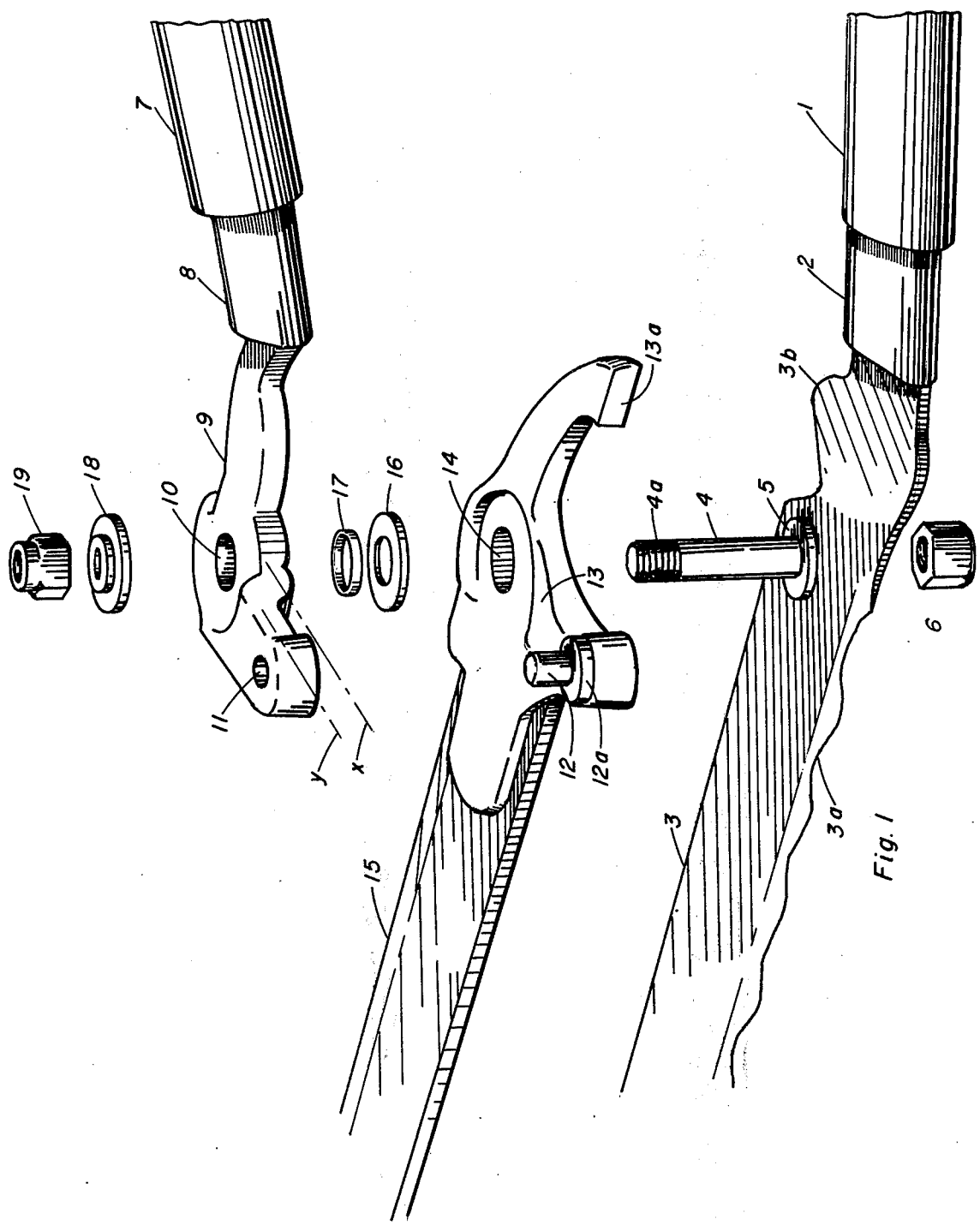
FIG. 1 is a fragmentary, perspective, exploded view of hedge shears embodying the present invention.

Referring more particularly to FIGS. 1 and 2 of the drawings, numeral 1 denotes a cylindrical or tubular covering of rubber or other resilient material which surrounds a metallic portion 2 forming the handle for the integral blade 3, preferably having a serrated cutting edge 3a as shown. Rigidly secured to blade 3 is a post 4 having a screw threaded outer end portion and having a washer 5 integrally securing the post 4 to blade 3. A small portion of the post 4 projects beyond the other end of the blade 2, as shown more clearly in FIG. 2, which portion is threaded and receives a nut 6 to form an integral assembly.

The other handle is comprised of a similar tubular covered member 7 surrounding metallic part 8 which is integrally attached to a somewhat L shaped driving element 9 having a hole 10 for pivotal mounting on the post 4. It will be particularly noted that the extremity portion of the driving element 9 is vertically offset from the central portion and is provided with a hole 11 near one end which loosely fits about a stud 12 integrally secured, by washer 12a, to a driven element 13 having a hole 14 which surrounds post 4 for pivotal movement.

The driven element 13 is integral with the other blade 15 and is provided with a stop end portion 13a which arrests closing movement of the blades when it engages the stop portion 3b integral with blade 3.

The lateral canting action of blade 15 is caused by the vertical offset of the extremity portion of the driving element 9 which has hole 11, as compared to the portion which has hole 10. The former portion has a central plane designated by the letter $y$, whereas the lateral portion has a central lower plane denoted by the letter $x$. The moment of applied force is represented by the vertical distance between the two planes $y$ and $x$ to provide the lateral tilting action of the driven element 13 which effects lateral tilt of blade 15 relative to blade 3, as better shown in the dotted outlines of FIGS. 3 and 4 wherein the tilting action is shown rather magnified to better illustrate it.

Between the driving element 9 and driven element 13 is a spring washer 16 and plain washer 17 surrounding post 4. Above the driven element 9 is a flat washer 18 and a nut 19 also surrounding post 4 and screw threaded to part 4a of the post 4.

In operation, assuming that the handles 1 and 7 are spread apart and that the cutting stroke is intiated by bringing them together, pivotal movement of the driving element 9 about post 4 as an axis will cause the vertically offset portion thereof to apply a force in plane $y$ against the pin 12 which loosely fits in hole 11. This will effect lateral tilt of the driven element 13 since it has a well portion for receiving the central portion of driving element 9 and is in a plane slightly lower than that indicated by letter $y$.

Therefore, as driven element 13 assumes the dotted line position shown in FIG. 3, it will cause the associated blade 15 to cant or tilt laterally so that its cutting edge portion is tilted as indicated in FIG. 4 and thereafter firmly rubs against the upper portion of blade 3 to provide a very positive cutting action as well as a sharpening action. Thus any twigs or heavy grass clippings cut will not effect separation of the blades. The cutting movement is arrested by engagement of stop 13a against stop 3b.

The blades are then spread apart at which time the driven element assumes the full line position shown in FIG. 3 and the canted blade 15 assumes the full line position shown in FIG. 4 until the blades are completely spread apart, after which the cutting motion is repeated in the manner described above.

While pin 12 is described as integral with driven element 13, it could be integral with driving element 9 instead, that is, integrally mounted in hole 12 thereof in which case it would cooperate with a hole in the position of pin 12, thus constituting a reversal of parts.

Thus it will be seen that I have provided highly improved hedge shears which are completely devoid of helical springs, therefore not requiring frequent adjustment, also which provides more positive lateral tilting or canting action of one of the blades so as to assure retention of the canting of the blade despite heavy resistance from twigs or grass clumps which might otherwise effect separation of the blades; furthermore, I have provided hedge shears which are much easier to operate than previous shears, thus minimizing tiring of the operator; also I have provided hedge shears having much longer life than those heretofore devised.

While I have illustrated and described a single specific embodiment of my invention, it will be understood that this is by way of illustration only and that various changes and modifications may be contemplated in my invention and within the scope of the following claims.

I claim:

1. Hedge shears comprising a blade and integral handle in substantially linear relationship, a post integrally secured at right angles to the end of the blade portion closest to the handle, a second handle having, integrally secured to the end thereof, a driving element of angle shape having a central vertical hole into which said post projects to provide a pivot and having a vertically and upwardly offset end portion with a vertical hole, a second blade integrally connected to a driven element having, on a lateral extension thereof, an upstanding integral stud which loosely fits into said lastmentioned vertical hole and having a substantially central hole fitting over said post, a resilient washer located between said driving and driven elements and surrounding said post, and means attached to the extreme end of said post for holding said driving and driven elements and intermediate resilient washer close together, whereby said stud has a force applied thereto as the result of the moment arm from said vertically offset relationship of said end portion.

* * * * *